April 26, 1955  R. D. SWANSON  2,706,941
LAWN EDGER
Filed Jan. 5, 1953  2 Sheets-Sheet 1
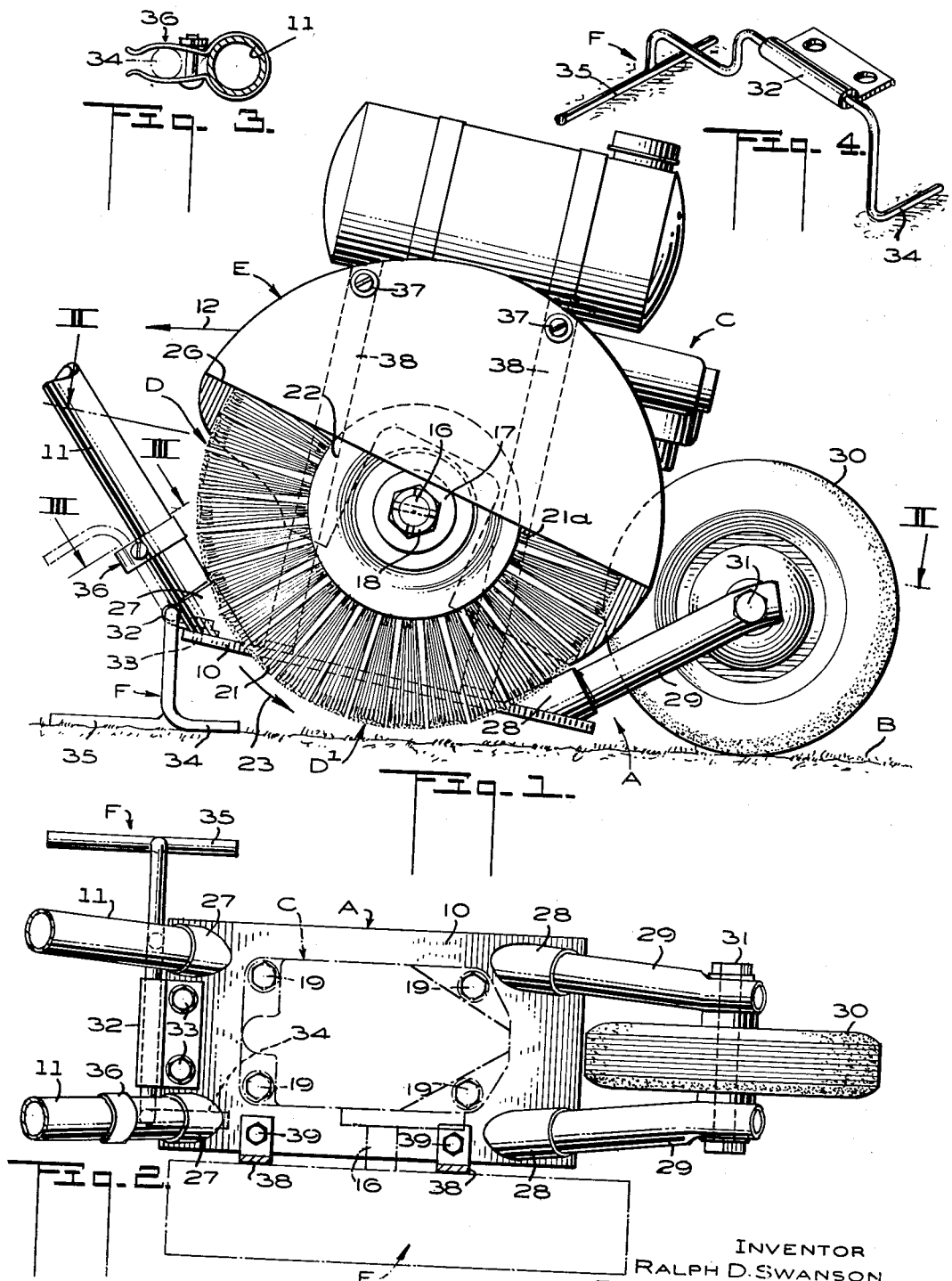
INVENTOR
RALPH D. SWANSON
BY *Munn & Liddy*
ATTORNEYS April 26, 1955  R. D. SWANSON  2,706,941
LAWN EDGER
Filed Jan. 5, 1953  2 Sheets-Sheet 2
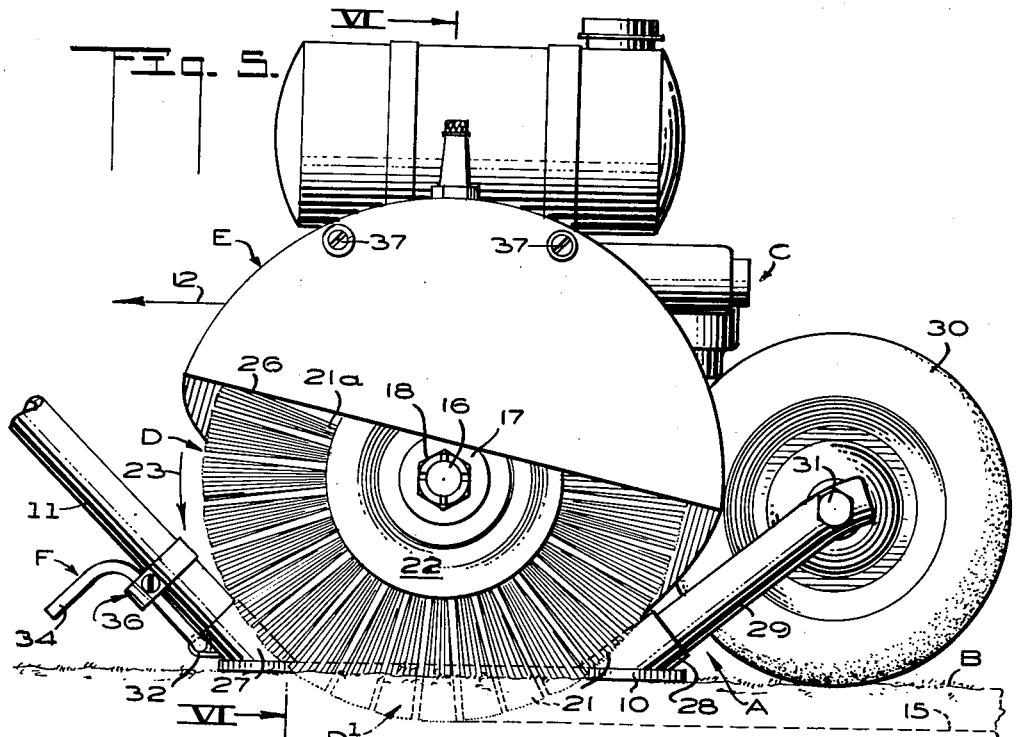
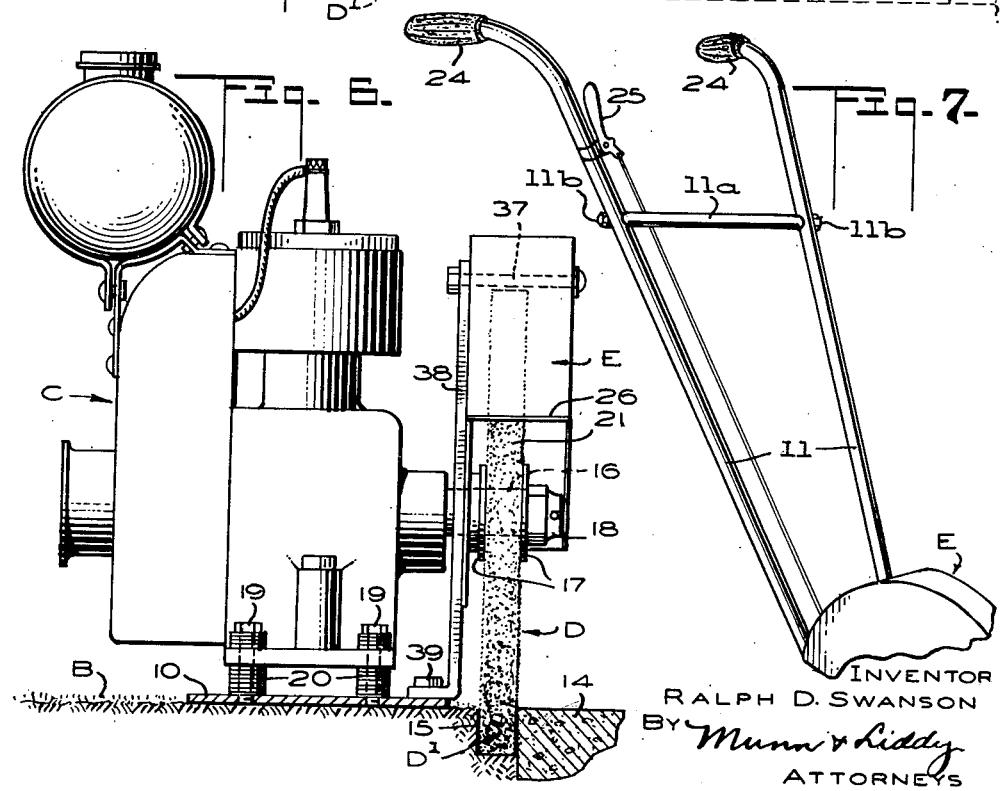
INVENTOR
RALPH D. SWANSON
BY Munn & Liddy
ATTORNEYS United States Patent Office 2,706,941
Patented Apr. 26, 1955

2,706,941

LAWN EDGER

Ralph D. Swanson, Reno, Nev.

Application January 5, 1953, Serial No. 329,549

4 Claims. (Cl. 97—227)

The present invention relates to improvements in a lawn edger, which is adapted for removing a narrow strip of lawn bordering a sidewalk, or the like, thereby eliminating the requirement of hand-trimming the strip.

An object of my invention is to provide a lawn edger, which may be used with great rapidity in removing an undesired strip of lawn along its border by cutting a groove into the ground as the edger is advanced over the lawn. In this manner, the growth of grass will be retarded for a considerable period of time, thus presenting a lawn with a neat edge.

Moreover, it is proposed to provide a device of the character described, which may be advanced with facility and ease along a predetermined path, resulting in edging the lawn and forming a groove of uniform depth therein to thus enhance the appearance of the lawn.

Another object is to provide a lawn edger that is simple in construction, durable and efficient for the purpose intended.

Other objects and advantages will appear as the specification continues. The novel features will be set forth in the claims hereunto appended.

Drawings

For a better understanding of the invention, reference should be had to the accompanying drawings, forming part of this application, in which:

Figure 1 is a fragmentary side elevational view of my lawn edger arranged in an inactive position, with its base plate and rotary brush being supported above the ground by a stand;

Figure 2 is a horizontal sectional view taken along the plane II—II of Figure 1, the power unit and guard shield for the rotary brush being shown by dot-dash lines;

Figure 3 is a sectional view taken along the inclined line III—III of Figure 1, illustrating a spring clip adapted for retaining the base-supporting stand in raised position;

Figure 4 is a perspective view of the stand by itself;

Figure 5 is a view similar to Figure 1, but disclosing the base plate lowered into a position to rest directly on the ground, and illustrating the rotary brush extending into the ground so as to cut a groove in the latter;

Figure 6 is a vertical transverse sectional view taken along the plane VI—VI of Figure 5, parts being shown in elevation; and Figure 7 is a perspective view of the handle bars and a portion of the guard shield.

While I have shown only the preferred form of my invention it should be understood that various changes, or modifications, may be made within the scope of the annexed claims without departing from the spirit thereof.

Detailed description

In carrying my invention into practice, I provide a frame structure indicated generally at A, which is adapted to be moved over a lawn B. This frame includes a base plate 10 having a power unit C mounted thereon, and the latter is provided with a rotary brush D.

Moreover, the frame structure A includes handle-bars 11—11, which may be grasped by an operator for advancing the lawn edger over the lawn B in the direction of the arrow 12 so that the rotary brush D will remove a strip of the lawn, for instance, adjacent to a sidewalk 14 (see Figure 6). At the same time, the brush will cut a groove 15 in the lawn along the border of the lawn, thus providing a neat appearance for the outline of the lawn.

For the purpose of illustration, I have shown the power unit C as consisting of an internal combustion engine having an output shaft 16 projecting laterally therefrom. The rotary brush D is secured to this shaft by clamping washers 17—17 and a lock nut 18 (see Figure 6).

It will be noted that the brush defines a lower peripheral section D1 projecting below the base plate 10. In Figures 2 and 6, the power unit C has been shown as being secured to the base plate 10 by studs 19. In order to permit the power unit to be adjusted toward and away from the base plate, a series of washers 20 are interposed therebetween. By varying the number of these washers, the depth of penetration of the brush into the underlying ground may be varied, it being observed that the base plate 10 rests directly on the ground during the edging of the lawn.

With respect to the brush itself, the bristles 21 are fashioned from relatively stiff but resilient material, for instance spring wire. These bristles will not damage sprinkler heads and other objects. The inner ends 21a of the bristles are rigidly secured to flanges 22 forming part of the brush.

It is important that the power unit C be made in such a manner as to rotate the brush D in the direction of the arrow 23 so that the lawn cuttings and cut dirt will be discharged in a direction extending away from an operator. In actual practice, the operator grasps the grips 24—24 provided on the upper ends of the handle-bars 11—11 (see Figure 7), and walks slowly backwards, thus affording a good view of the work. The speed of the power unit may be regulated by a control 25 mounted on one of the handle-bars.

In order to protect the operator, a guard shield E is provided over the upper peripheral section of the brush D. However, the lower marginal edge or rim 26 of this shield is inclined upwardly toward the handle-bars 11—11 to thus expose the lower part of the brush to observation by the operator.

For the purpose of removably attaching the handle-bars to the leading end of the base plate 10, the latter is provided with socket-like bosses 27—27 into which the lower ends of the handle-bars are screwed. A second set of similar bosses 28—28 are fixed to the trailing end of the base plate, and have pipe-like brackets 29—29 threaded thereinto so as to extend upwardly therefrom on an incline. In Figures 1, 2 and 5, I have shown a ground-engaging wheel 30 as being rotatably secured to the upper ends of these brackets by a journal bolt 31.

In order to support the rotary brush D in elevated position out of contact with the ground, I have provided a stand F of the shape shown in Figure 4. This stand is swingably attached by a journal clip 32 and studs 33—33 to the leading end of the base plate (see Figure 2). This stand defines an angle-shaped leg 34 at one side thereof and a bar-like foot 35 at its opposing side. When the stand is swung into an active position, as in Figure 1, the leg 34 and the foot 35 rest upon the ground to thus maintain the base plate 10 in raised position. At this time the brush D is elevated out of contact with the ground. Furthermore, the stand is designed to hold the entire device from tipping laterally.

Prior to edging the lawn B, the stand F is swung into an inactive position, as in Figure 5, thus allowing the rotating brush to extend into the ground. A spring clip 36 is attached to one of the handle-bars 11, and embraces the leg 34 to hold the stand in raised position.

In Figures 1, 2 and 6, the guard shield E has been shown as being secured by bolts 37—37 to the upper ends of brackets 38—38, the latter having their lower ends anchored by studs 39—39 to the base plate 10.

Summary

The operation of my lawn edger is summarized briefly as follows:

Prior to starting the power unit C, the stand F is swung into an active position, as shown in Figure 1, thus raising the base plate 10 and the brush D out of contact with the ground. At this time, the stand F and the wheel 30 constitute supports for the base plate.

Now the stand is swung into an inactive position (see Figure 5), thereby permitting the lower peripheral section D1 of the rotating brush D to extend into the ground to cut a groove 15 therein as the frame structure A is advanced in the direction of the arrow 12. At this time, the base plate 10 rests directly on the ground to thus provide a groove of uniform depth as the device is advanced by the operator when grasping the handle-bars 11—11.

The power unit C is made to turn the brush D in the direction of the arrow 23, and thus the brush materially assists in moving the lawn edger along the ground. The device is practically self-propelled due to the rotating brush engaging with the ground. Moreover, the cut material and dirt are discharged rearwardly away from the operator.

It will be noted that the entire device is well balanced, and may be readily dismantled within a short period of time.

In Figure 7 of the drawings, the handle-bars 11—11 have been shown as being interconnected by a cross brace 11a. This brace may be removably secured to the handle-bars by stud bolts 11b—11b.

As a further use of my lawn edger, the brush D may be passed over a previously-cut groove 15 at a higher elevation from that disclosed in Figure 5 to blow all loose dirt and grass out of this groove.

As clearly shown in Figure 5, the underneath surface of the base plate 10 is disposed substantially tangentially to a lower section of the periphery of the wheel 30, whereby the latter will provide additional support for the device when the base plate rests on the ground. Moreover, in the event that the leading end of the base plate should tend to dig into the lawn, as the device is moved in the direction of the arrow 12, the operator may lift the handle-bars 11—11 slightly, which will result in elevating the base plate, and the wheel 30 will immediately come into operation and constitute a support for the trailing end of the base plate.

I claim:

1. In a lawn edger: a frame structure adapted to be moved over a lawn, and including a base plate having a power unit mounted thereon; a rotary brush driven by the power unit, and having relatively stiff but resilient bristles; the base plate being movable into a lowered position until it rests directly on the underlying ground to be supported thereby; the brush having a lower peripheral section disposed to engage with and edge the lawn when the base plate rests on the ground and is advanced thereover; a ground-engaging wheel secured to one end of the base plate; and an adjustable stand attached to an opposite end of this plate; the stand being movable into engagement with the ground, with the stand and wheel supporting the base plate in an elevated position, wherein the brush is out of contact with the ground.

2. In a lawn edger: a frame structure adapted to be moved over a lawn, and including a base plate having a power unit mounted thereon; a rotary brush driven by the power unit; the base plate being movable into a lowered position until it rests directly on the underlying ground to be supported thereby; the brush having a lower peripheral section disposed to engage with and edge the lawn when the base plate rests on the ground and is advanced thereover; a ground-engaging wheel secured to the base plate; and an adjustable stand attached to this plate; the stand being movable into engagement with the ground, with the stand and wheel supporting the base plate in an elevated position, wherein the brush is out of contact with the ground.

3. In a lawn edger: a frame structure adapted to be moved over a lawn, and including a base plate having a power unit mounted thereon; a rotary brush driven by the power unit; the base plate being movable into a lowered position until it rests directly on the underlying ground to be supported thereby; the brush having a lower peripheral section disposed to engage with and edge the lawn when the base plate rests on the ground and is advanced thereover; a ground-engaging wheel secured to the base plate; and an adjustable stand attached to this plate; the stand being movable into engagement with the ground, with the stand and wheel supporting the base plate in an elevated position, wherein the brush is out of contact with the ground; the stand having a pair of ground-engaging feet thereon spaced laterally with respect to the base plate; these feet being positioned to hold the entire lawn edger from tipping laterally, when the base plate is elevated and the feet are moved into active plate-supporting engagement with the ground.

4. In a lawn edger: a frame structure adapted to be moved over a lawn, and including a base plate having a power unit mounted thereon; a rotary brush driven by the power unit; the base plate being movable into a lowered position until it rests directly on the underlying ground to be supported thereby; the brush having a lower peripheral section disposed to engage with and edge the lawn when the base plate rests on the ground and is advanced thereover; a ground-engaging wheel secured to the base plate; and an adjustable stand attached to this plate; the stand being movable into engagement with the ground, with the stand and wheel supporting the base plate in an elevated position, wherein the brush is out of contact with the ground; the base plate having an underneath surface disposed substantially tangentially to a lower peripheral section of the wheel.

References Cited in the file of this patent

UNITED STATES PATENTS

| | | |
|---|---|---|
| 1,313,866 | Sopousek | Aug. 19, 1919 |
| 1,365,192 | Petit | Jan. 11, 1921 |
| 1,493,670 | Galvin | May 13, 1924 |
| 2,084,398 | Jongeneel | June 22, 1937 |
| 2,139,353 | Bruder | Dec. 6, 1938 |
| 2,630,747 | Mintz | Mar. 10, 1953 |